C. MARCQ & O. HELSON.
TIPPING DEVICE FOR VEHICLES AND STATIONARY TIPPING DEVICES.
APPLICATION FILED JAN. 29, 1912.
1,165,890.
Patented Dec. 28, 1915.
3 SHEETS—SHEET 1.
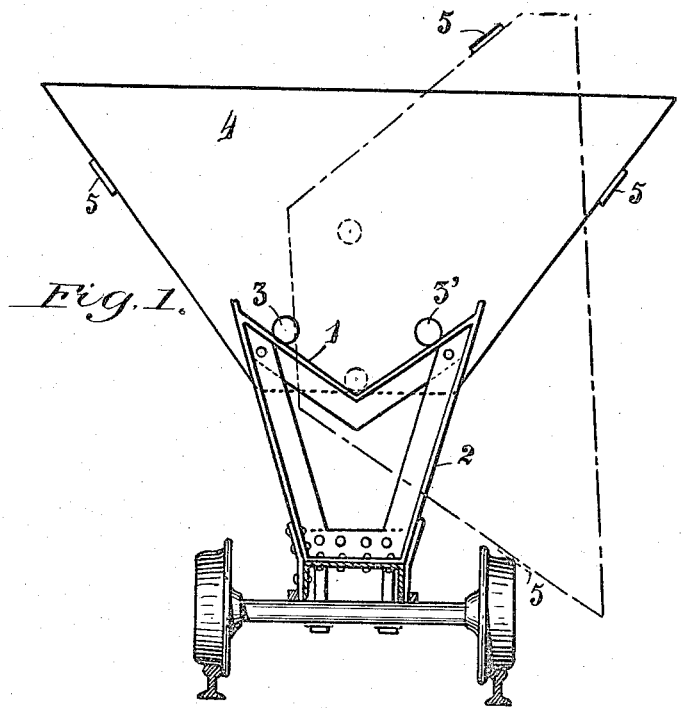
Fig.1.
FIG.2
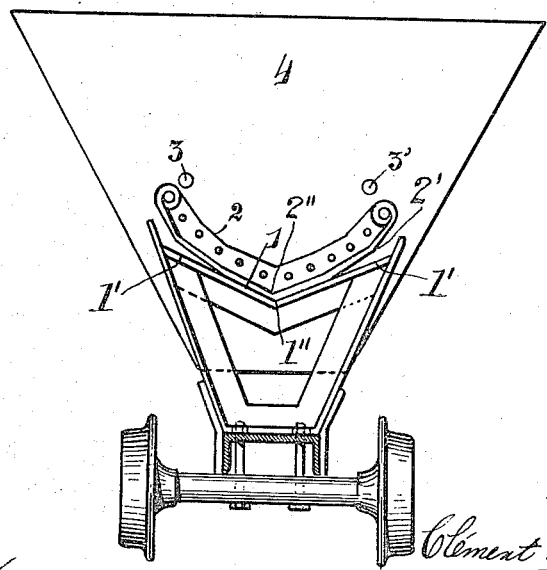
Witnesses:
M. Roche
Ed. Cromebu
Inventors:
Clement Marcq
and
Omer Helson
by B. Singer
Atty

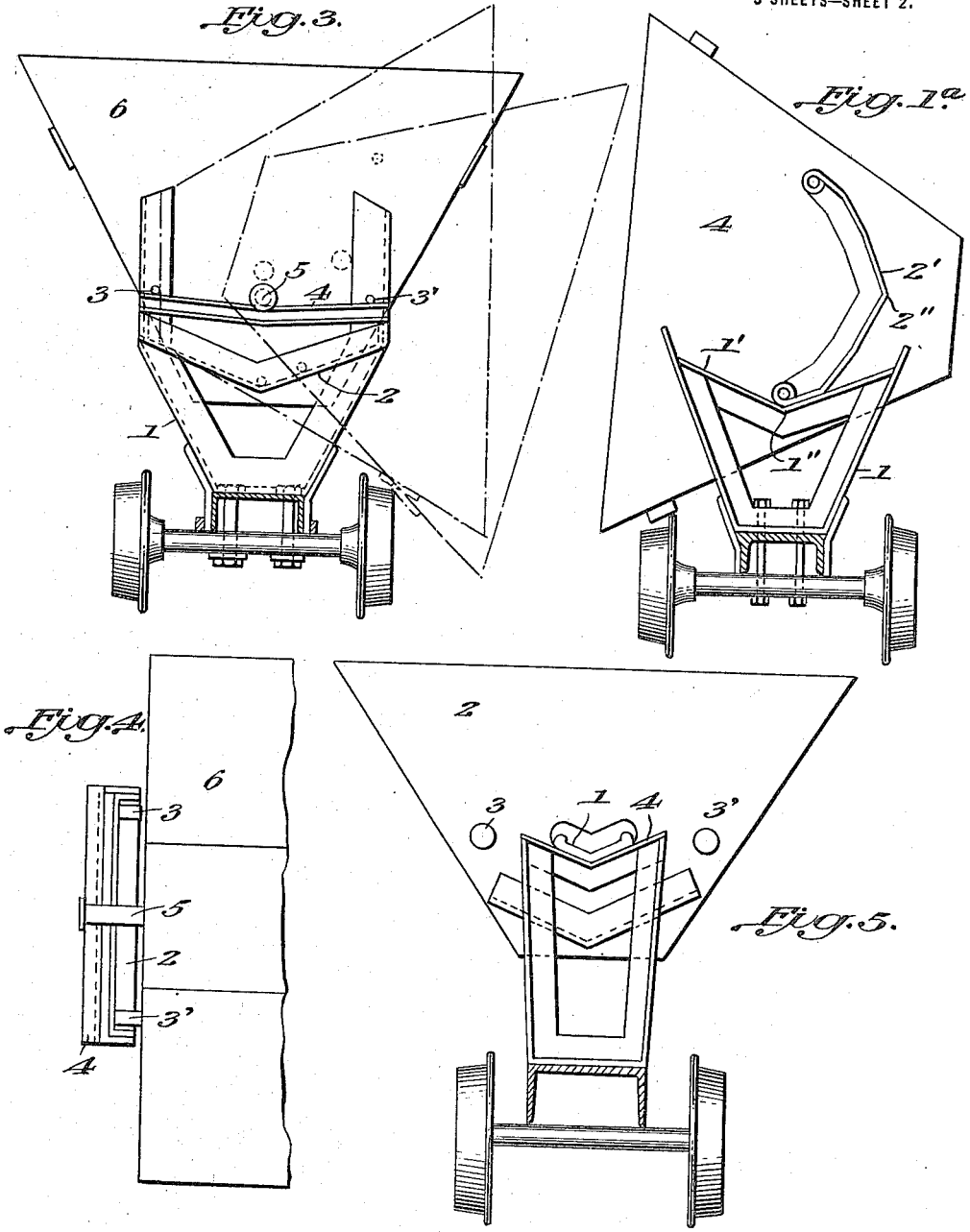

C. MARCO & O. HELSON.
TIPPING DEVICE FOR VEHICLES AND STATIONARY TIPPING DEVICES.
APPLICATION FILED JAN. 29, 1912.

1,165,890.

Patented Dec. 28, 1915.
3 SHEETS—SHEET 3.

UNITED STATES PATENT OFFICE.

CLÉMENT MARCQ AND OMER HELSON, OF LIEGE, BELGIUM.

TIPPING DEVICE FOR VEHICLES AND STATIONARY TIPPING DEVICES.

1,165,890.

Specification of Letters Patent.

Patented Dec. 28, 1915.

Application filed January 29, 1912. Serial No. 674,037.

*To all whom it may concern:*

Be it known that we, CLÉMENT MARCQ and OMER HELSON, both subjects of the King of Belgium, both residing at 68 Rue Fosse Crahay, Liege, Belgium, have invented certain new and useful Improvements in Tipping Devices for Vehicles and Stationary Tipping Devices; and we do hereby declare the following to be a full, clear, and exact description of the invention, such as will enable others skilled in the art to which it appertains to make and use the same, reference being had to the accompanying drawings, and to letters or figures of reference marked therein, which form a part of this specification.

This invention relates to a tilting mechanism for vehicles of all kinds in which the vehicle body is pivotally or otherwise supported in bearings, chairs or vertical brackets. All known tilting mechanisms of this kind possess one or the other of the following disadvantages: The tilting action presents difficulties or it is insufficient to completely discharge the vehicle; the vehicle is not stable when it is in normal position; it is impossible to load the wagon in its various inclined positions without providing the tilting body with more or less complicated adjusting devices; or finally, the vehicle is becoming instable after the tilting operation and is therefore liable to turn over.

It is the object of the present invention to overcome all of these disadvantages by providing an improved tilting mechanism for vehicles of all kinds by supporting the tilting body of the vehicle on a V-shaped or concaved slide-way by means of a rocker or other suitable member of similar construction, while pivots on the vehicle body engage said slide-way during the tilting operation.

The point or points of support of the body on the slide-way may be so chosen that the tilted position of the body may easily be maintained. During the tilting action the center of gravity of the wagon body moves downward and comes into alinement with the center line of the track. May the vehicle be empty or tilted, or partly empty the center of gravity always remains between the points of support of the body on the slide-way.

The accompanying drawings illustrate by way of example several embodiments of this invention.

Figure 6:
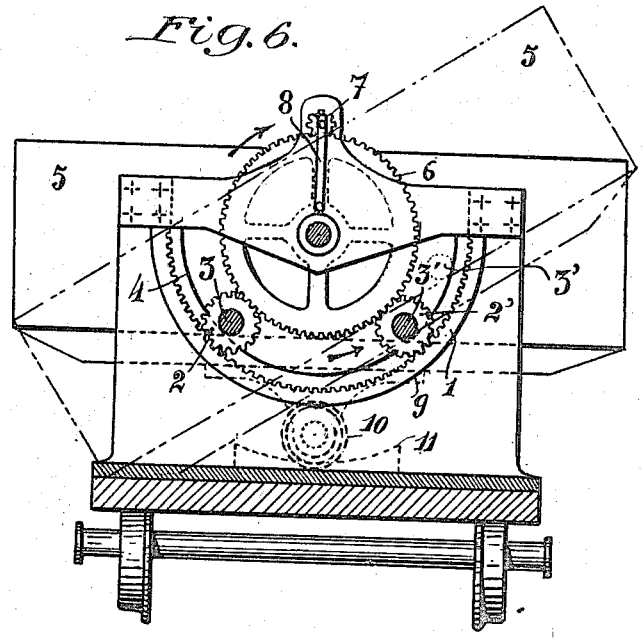
Figure 7:
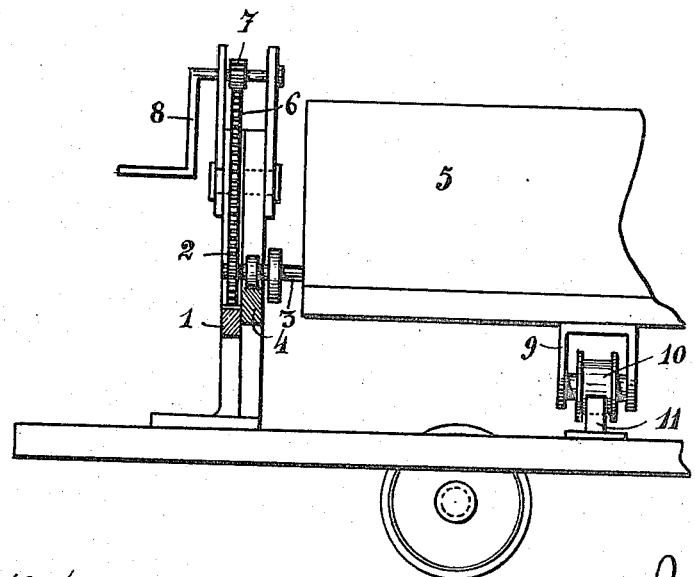

Figure 1 is an end view of the vehicle built according to the present invention. Fig. 1ª is a similar view of a vehicle with the preferred form of tilting mechanism, the vehicle body being shown in its tilted position. Fig. 2 is a similar view with the body in its non-tilted position. Figs. 3 and 4 are end and top plan views respectively of modified forms of our invention. Fig. 5 is an end view of another modified form of our invention. Fig. 6 is an end view of a truck with another modification of the invention. Fig. 7 is a detail view of the operating mechanism used with the vehicle shown in Fig. 6.

As shown in Fig. 1, 1 denotes the slide-way integrally made with the vertical bracket 2, and of V-shape, while the pivots 3 and 3' are secured to the body 4 of the vehicle. It will be clear that in order to bring the body 4 of the vehicle into the tilted position the pivots will have to move over the slide-way until a backing piece 5 provided on the body of the vehicle rests against the wheel of the same. To facilitate the rolling off of the pivots 3 and 3' on the slide-way they may be provided with suitable rollers.

As shown in Fig. 1ª, the V-shaped support 1 has interior and upwardly facing supporting portions 1' while the rocker 2 has exterior faces 2' engaging the supporting faces 1'. The faces 1' are upwardly inclined and diverge from a lower central point 1''. The faces of the rocker are downwardly inclined and converge toward a central point 2''.

In Fig. 2 the support 1 is also of V-shape but the tilting body in addition to the pivots 3 and 3' is provided with a V-shaped rocker 2. The polygonal concave form of this rocker governs the displacement of the centers of gravity of the body during its tilting and retilting actions. The pivots 3 and 3' stop at the end of the slide-way when the body of the vehicle is tilted. The rocker 2 may be replaced by a series of pivots.

Figs. 3 and 4 illustrates a third embodiment of the invention in which each bracket 1 carries a slide-way 2 adapted to support the pivots 3 and 3' after the body of the vehicle has been tilted, and a second slide-way 4 which will support a pivot 5 longer than the pivots 3 and 3′. In upright position the pivot 5 alone supports the body 6 but in the tilted position the pivots 3 and 3′ come into contact with the slide-way 2.

In Fig. 5 the pivot 5 of the last described embodiment is replaced by a rocker 1 of V-shape in contact with the slide-way 4 of the vertical bracket so as to automatically balance the body 2 until, after the tilting has taken place, the pivot 3 or 3′ comes into contact with the slide-way 6.

Figs. 6 and 7 show the invention applied to a truck. In this instance the slide-way is constituted by a segmentary wheel 1 with teeth at its inner periphery. Two pinions 2 and 2′ are in engagement with this wheel and on their spindles are mounted 2 rollers 3 and 3′ working on a second slide-way 4 and forming supports for the truck body 5. The pinions 2 and 2′ are also in engagement with the toothed wheels 6 in mesh with the small pinion 7 which is rotated by a handle 8.

Below the truck body 5 are secured a sufficient number of brackets 9 carrying one or two flanged rollers 10 working on a slide-way 11 secured to the truck frame.

In order to tilt the truck body into the position shown in dotted lines, the handle is turned in the direction of the arrow. The pinion 7 drives the toothed wheel 6 in the reverse direction which causes the pinions 2 and 2′ to travel in the direction of the arrow following the curvature of the wheel 1 and carrying the pivots along which compels the truck body to tilt.

It is obvious that the doors of the truck may be arranged in any suitable manner. The improved tilting mechanism has been shown only in connection with vehicles but it may evidently just as well be adapted for stationary tilting devices and other suitable purposes.

What we claim is:—

A dump car comprising in combination, a running gear and a frame thereon having an upwardly facing rocker support provided with upwardly inclined straight faces diverging from a lower central portion, a box for said car, and a rocker on the box having downwardly inclined sections converging toward the center of said rocker and fitting said support, faces near the central portions thereof, the outer portions of said rocker sections being inclined upwardly with respect to its converging sections, the extremities of said rocker being rounded for forming pivotal supporting points for said rocker sections upon the rocker support, for facilitating the tilting operation of the car.

In testimony that we claim the foregoing as our invention, we have signed our names in presence of two subscribing witnesses.

CLÉMENT MARCQ.
O. HELSON.

Witnesses:
ALBERT BÉNASET,
A. V. CRUGER.